United States Patent [19]

Morrison et al.

[11] Patent Number: 5,033,096

[45] Date of Patent: Jul. 16, 1991

[54] NON-CONTACT DETERMINATION OF THE POSITION OF A RECTILINEAR FEATURE OF AN ARTICLE

[75] Inventors: Bruce R. Morrison, Jamberoo; John S. H. Lake, Balgownie, both of Australia

[73] Assignee: John Lysaght (Australia) Limited, Sydney, Australia

[21] Appl. No.: 184,911

[22] Filed: Apr. 22, 1988

[30] Foreign Application Priority Data

Apr. 22, 1987 [AU] Australia ................................. PI1536
Jul. 14, 1987 [AU] Australia ................................. PI3123
Jul. 14, 1987 [AU] Australia ................................. PI3124

[51] Int. Cl.$^5$ ............................................... G06K 9/00
[52] U.S. Cl. ............................................ 382/8; 382/18; 382/45; 382/48; 250/560; 356/376
[58] Field of Search ................... 358/101, 125, 210; 356/376, 389; 382/45, 47, 48, 18, 8, 1; 250/560, 561

[56] References Cited

U.S. PATENT DOCUMENTS 4,609,934  9/1986  Kozawa et al. ...................... 358/101

Primary Examiner—Michael Razavi
Attorney, Agent, or Firm—Armstrong, Nikaido, Marmelstein, Kubovcik & Murray

[57] ABSTRACT

A high resolution CCD video camera (6) is positioned and aligned with respect to an illuminated article (7) so that a straight edge of the article, or a straight line junction between a bright zone and a dark zone of its surface, crosses the field of view of the camera in a direction substantially parallel to the rows of the camera's orthogonal array of rows and columns of light responsive elements, to divide that field of view into bright and dark zones. A frame store and digitizer (9) converts the individual signals generated by the elements into digital grey values. The grey values derived from the elements of each row are summed by a computer (10) to produce a linear array of summation values positionally related to the respective columns, and the computer then determines the position of the edge or junction to a sub-column spacing accuracy by determining the mean value of two of the summation values selected respectively from a row receiving energy from the bright zone and one receiving energy from the dark zone and establishing a position in the array for the mean value, and thus for the feature, by interpolating the mean value between the two summation values immediately above and below it in magnitude.

17 Claims, 5 Drawing Sheets

FIG.4a
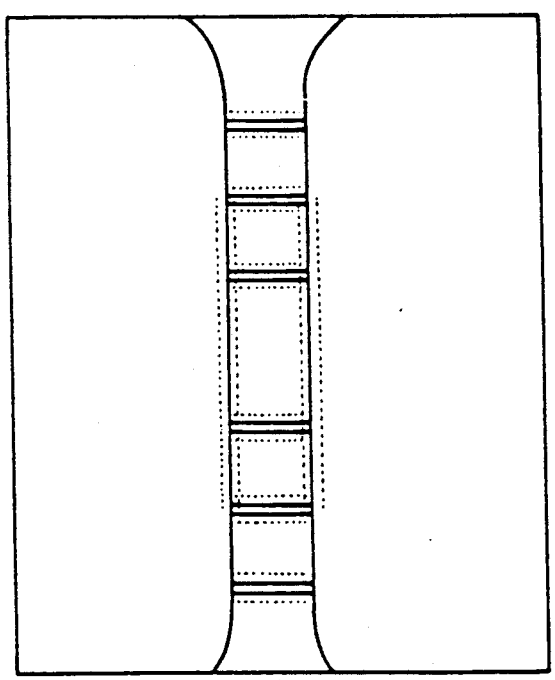
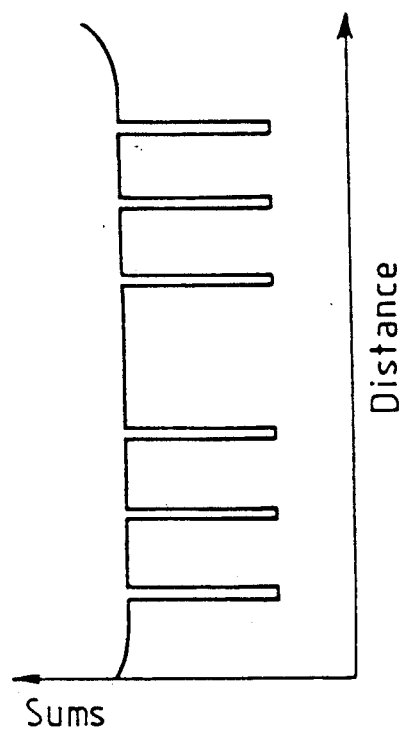
Sums
FIG.4b
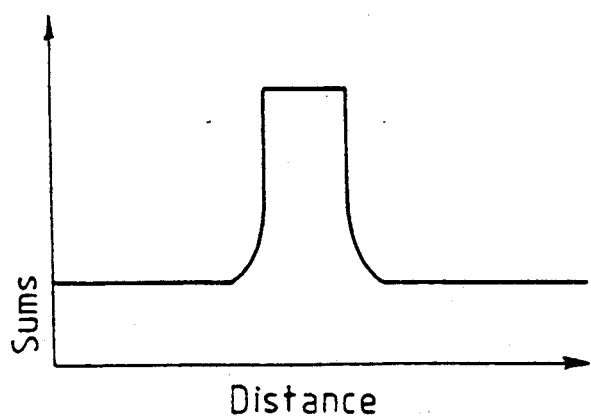
FIG.4c

NON-CONTACT DETERMINATION OF THE POSITION OF A RECTILINEAR FEATURE OF AN ARTICLE

FIELD OF THE INVENTION

This invention relates to the determination of the position of a rectilinear feature of an article by means making no physical contact with the article. More particularly, the invention is concerned with making such determinations by electro-optical means which determine the position of an abrupt rectilinear change in the brightness of a field of view coinciding with the feature of the article. The feature may, for example, be a straight edge of the article appearing against a contrasting or differently illuminated background or it may be a straight junction line between differently inclined or contrastingly conditioned or coloured zones of the surface of the article.

The determination may be made to enable the location of the article with reference to its environment to be ascertained, and maybe controlled. For example, the tracking of an edge of a strip, sheet, web, bar or other article passing along a continuous production or treatment line, or of a belt or other conveyor for such an article, may be monitored by apparatus according to the invention for the control of the process.

Alternatively the positions of two or more spaced apart features may be determined to enable the distance between them, and thus a dimension of the article to which they relate, to be determined. For example, the edges of rectilinear indicia on a tensile test piece may be observed and the distances between them determined at intervals as testing proceeds, to enable the properties of the material of the piece to be established.

The invention has application in the steel making industry for edge tracking and/or measuring the width of steel strips during production operations such as rolling. Likewise it may be applied to the paper making industry for the control of printing or other operations on moving webs or the like. The invention also has application to the trimming of strips to reduce the strip width to a precisely known desired value. In these applications it is necessary to accurately position one or both edges of a moving strip for width measurement and/or guiding purposes. The invention is also well suited for the non-contact extensometry of steel or other test pieces.

DESCRIPTION OF THE PRIOR ART

Determinations of the kind in question have been effected by utilising one or more video cameras to observe the article or articles, coupled with processing means to extract the required information from the video image or image signals.

U.K. Patent No. 1,271,990 discloses an early proposal in which a dimension is read more or less directly from the video image produced by a (presumably) vidicon camera. That early proposal is not capable of producing results of an acceptable accuracy for most practical purposes.

E.P. Nos. 29,748 and 94,522 and U.S. Pat. No. 4,499,383 disclose more sophisticated arrangements utilising at least one, more stable and inherently more accurate, charge coupled device (CCD).

These last mentioned prior proposals utilise signals from a line scan across the article to produce a linear array of values from which, in these instances, the positions of the edges of the article are derived.

As the individual values of the linear array are derived from the radiation from equally spaced apart points on the scanning line they may be plotted as a curve of radiation intensity against distance, that is to say as a radiation profile taken along the scan line. It is convenient, to simplify the description of the invention and facilitate comprehension of it, sometimes to treat such a linear array of values as being such a curve or profile and where appropriate they are so referred to hereinafter.

Such prior known techniques produce information about a single cross-section of the article and may lead to misleading results if the particular cross-section is not typical, for example if the scanning line happens to coincide with a minor edge defect or a localised variation in radiation emission or reflection characteristics affecting the input radiation received by the CCD, and thus the output signals produced by it. Furthermore the individual values of the linear array (shape of the radiation profile) derived from a line scan are affected by random errors in the signals from the individual radiation responsive elements of the CCD, due, for example to background electrical "noise" or quantum errors. Such errors may easily amount to 4 or 5 units in signals of the order of from 0 to 256 units and may seriously degrade the final results.

Another defect of the prior proposals is their reliance on determining the point of maximum slope of the radiation profile to locate the position of the abrupt change in the brightness of the field of view and thus, the position of the corresponding feature of the article. This is unsatisfactory not only because of the complex, and therefore slow, data processing involved but also because, in practice, the maximum slope often extends without appreciable change for a considerable profile length, making a precise point determination impossible. E.P. No. 29,748 proposes to overcome that difficulty by locating points to each side of the point of maximum slope of a predetermined lesser slope and interpolating to find the nominal point of maximum slope, but this further complicates, and thus further slows, the data processing, which is detrimental if successive readings are rapidly required for the effectively continuous monitoring of, say, a moving strip or web.

SUMMARY OF THE INVENTION

An object of the invention is to provide a method and apparatus utilising a camera with a radiation-responsive sensor of the kind comprising a solid state orthogonal array of radiation sensitive elements arranged in rows and columns (referred to generically as "files" hereinafter) and corresponding in number and disposition to the pixels of a video image, for determining the position of a rectilinear feature of an article causing or constituting an abrupt change in the brightness of the camera's field of view, which overcomes or at least ameliorates the deficiencies of the prior art discussed above.

When it is unnecessary or undesirable to distinguish between a row or column, the term "file" is used hereinafter as a generic term meaning either a row or a column.

The invention achieves that object primarily by providing a method wherein the radiation profile from which the determination of position is made is derived not from signals from a file of elements perpendicular to the feature, as in the prior art, but from the totals obtained by summing the signals from the elements of each of a plurality of files of elements parallel to the feature. Thus the value of the linear array defining the radiation profile are individually representative of a substantial length of the feature of the article being observed.

Putting it another way, one may say, whereas the prior art uses data derived from a line scan, the invention captures different data and processes it to obtain the effect of what could be termed a broad band scan, from which considerable benefits accrue.

As the noise errors in the signals from each element of the CCD are truly random the summing process largely cancels them out and as each summation value is derived from individual signals corresponding to many points along a length of the feature, localised abnormalities therein do not have a substantial effect on the value.

Preferred embodiments of the invention also provide for a simple but effective method of processing of the summation values to define a derived radiation profile and to locate the point thereon corresponding to the feature of the article.

According to one aspect the invention consists in a method of locating the position of a rectilinear feature of an article coinciding with an abrupt change in the intensity of radiation emitted by or reflected from the article, utilising a radiation-responsive sensor of the kind having a plurality of uniformly spaced apart individual elements disposed in files in an orthogonal array, and each generating a signal indicative of the amount of radiation received from a portion of the sensor's field of view corresponding to the element's position in the array, characterised by the steps of positioning the sensor to ensure that its field of view includes a substantial length of the feature, aligning the sensor so that the co-ordinate axes of said array are respectively substantially parallel or perpendicular to the feature, summing the signals produced by a plurality of the elements of each of a plurality of files extending in the direction of the parallel axis to derive summation values, allocating the summation values to positions in a linear array corresponding to the positions at which the respective files from which each summation value was derived intersect the perpendicular axis, to define a derived radiation profile as from a broad band scan across the feature, and calculating the position of the feature with reference to said perpendicular axis from said linear array.

According to a second aspect the invention consists in apparatus for effecting the method of the invention of the kind comprising a radiation-responsive sensor having a plurality of uniformly spaced apart individual elements disposed in files in an orthogonal array, and each generating a signal indicative of the amount of radiation received from a portion of the sensor's field of view corresponding to the element's position in the array, characterised by sensor mounting means positioning the sensor so that a substantial length of the feature is included in the filed of view and aligning the sensor so that the co-ordinate axes of said array are respectively substantially parallel or perpendicular to the feature, a frame grabber to digitise the generated signals and to capture frames of the generated signals, and data processing means to process the captured signals; said data processing means summing the signals derived from a plurality of the elements of each of a plurality of files extending in the direction of the parallel axis, allocating the summation values to positions in a linear array corresponding to the positions at which the respective files from which each summation value was derived intersect the perpendicular axis, to define a derived radiation profile as from a broad band scan across the feature, and calculating the position of the feature with reference to said perpendicular axis from said linear array.

It will be noted that in the foregoing description of the invention the ultimate result is an indication of the position of the feature with reference to a co-ordinate axis of the sensor's array of elements. That of course corresponds to the position of the feature as it would be seen in a normal video image. This is because the apparatus is dealing with derived information or video images and may only directly indicate the position of one point of a video image relative to the image as a whole. If an absolute determination of the position or dimension of an article is required it is necessary to calibrate the apparatus beforehand by determining the indicated positions of the features of a test article of known location and dimensions and thereafter comparing the respective indications.

For preference, the radiation-responsive sensor is indeed a high resolution CCD type video camera. Such solid state cameras have several advantages over conventional cameras based on video tubes. For example, the signal output from the individual elements is directly proportional to the light gathered, the image cannot be burnt into the elements, and the positions of the elements in the array are very accurately defined by the manufacturing process.

The individual captured signals corresponding to each frame of video signals are preferably digitised by the frame grabber and transmitted to and stored in the memory of a computer. Software routines controlling that computer may then be used to effect the summations and determine tue required position of the feature.

The location of the feature is preferably determined by first using an approximate feature position algorithm and then using a straight line interpolation between two summation value points on the derived radiation profile an equal number of points from and on opposite sides of the point corresponding to the mean value of two remote summation values respectively representing bright and dark plateaux on opposite sides of the feature.

Preferably the interpolation is made between the two summation value points on opposite sides of and nearest to the means value point. It will be appreciated however that any appropriate interpolation technique may be used. In particular, it may be preferred to derive a curve of "best fit" for the summation values and use that curve, instead of the actual plot of those values, as the derived radiation profile.

By way of example, two embodiments of the invention are described hereinafter with reference to the accompanying drawings.

BRIEF DESCRIPTION OF THE DRAWINGS

FIG. 4 is a representation of the field of view of a CCD camera including the test piece of FIG. 3 and showing two relevant small scale derived radiation profiles.

DESCRIPTION OF THE PREFERRED EMBODIMENTS

Figure 1:
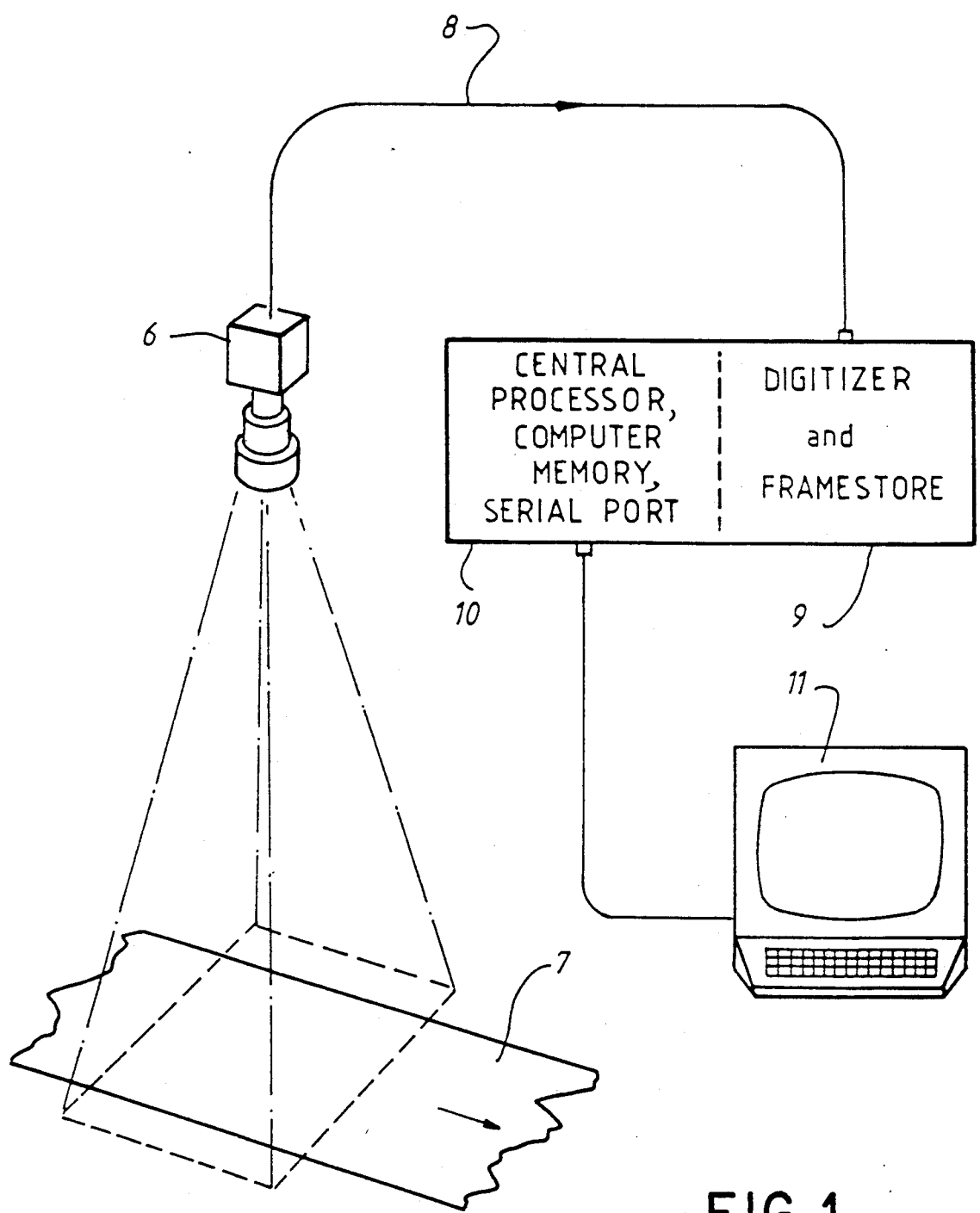
FIG. 1 is a schematic diagram showing a simplified version of the apparatus for detecting the positions of the edges of a moving strip.

In relation to FIG. 1 the invention is described as applied to a strip width measurement and edge tracking system for steel strip continuously produced by a rolling mill.

That strip width measurement and edge tracking system comprises a solid state video camera and lens combination 6 appropriately positioned with respect to the strip 7 and connected via a video link 8 to a frame grabber 9 comprising a digitiser and frame store. The frame grabber 9 is interfaced with an appropriate computer 10 which is connected with a terminal or monitor 11. The components and design criteria of the system are described in more detail below under their respective headings.

1. CAMERA

The preferred solid state array camera consists of a two-dimensional orthogonal array of individual radiation responsive elements, each of which gives a voltage signal proportional to the incident light intensity. The sensing elements have a well defined reception area, and there are well defined dead bands or tracks separating them. The array of elements is formed on a monolithic substrate using photolithographic processes, and forms an extremely regular and highly stable system.

A suitable camera is any commercially available solid state array camera having high light sensitivity, high resolution and preferably one with a guarantee of no dead pixels.

2. LENS

Ideally the lens is of high quality, to minimize distortion, and of long focal length. Errors will be caused by barrel distortion, movement of the strip pass line, tilting of the strip towards one edge, and deviation of the camera axis from the perpendicular to the strip. All of these errors are minimized by having a long focal length lens. For 1 m wide strip, barrel distortion becomes insignificant if the camera is more than about 20 m from the strip. This entails that the focal length of the lens should be 200 mm in order to provide a field of view that is occupied substantially by the strip, but which also overlaps the strip edges significantly. Lenses of shorter focal length can be tolerated, allowing the system to operate substantially closer to the strip than 20 m, but a correction for barrel distortion would have to be calculated, and the effects of pass line movement would be more significant.

3. CAMERA ORIENTATION WITH RESPECT TO THE STRIP

CCD array cameras have electronic hardware that turns the image held by the individual elements in the sensor array into a stream of video information. Normally, and for preference, this video stream follows the rules set down in television standards such as RS-170 (North America) and CCIR (Australia, Japan and parts of Europe). However, the rate at which the video information is generated does depend to a small degree on the temperature of the controlling clock, (in practice, the ambient temperature of the camera surrounds). In an environment such as a steel mill which is not air conditioned, variations in temperature can cause a small variation in the rate of information generation, and hence an apparent change of the size of an object in the field of view. The video stream sends information from the two-dimensional orthogonal array of rows and columns one row at a time. At the end of each row there is a synchronization pulse which acts as a terminator for the old row and an initiator for the new row. Thus the whole frame of information corresponding to a single full image is not sent as a single block, but as a series of concatenated rows. As a result, errors in measurement due to variations in clock speed occur only in dimensions which lie along a row, and not in dimensions which lie across a row (i.e. along a column). It follows that it is the scanning (row) direction of the camera which is preferably aligned parallel to the strip edge.

4. ILLUMINATION

CCD cameras are more sensitive to light than cameras based on tubes, and in most instances the ambient lighting conditions at the measurement station would allow adequate images to be collected. However, there can be some special circumstances where either additional illumination is required, or where some special precautions have to be taken. For example, if the change in ambient lighting between day-time and night-time is very large, then either additional lighting will be required, or a lens is required which has electronic aperture control. Another special case is where part of the strip may be strongly illuminated, while other parts are in shadow. Strong local lighting over the whole strip width, possibly associated with screens against the uneven source of illumination, would be required to ensure correct operation of the device.

In the case of strip hotter than about 500° C., thermal radiation from the strip surface may obviate the need for any form of external illumination. It may be necessary to provide the camera with an infra-red filter, in order to avoid excessive blurring of the strip image.

5. IMAGE EXPOSURE

Video cameras, whether based on tubes or solid state arrays, are subject to a phenomenon called "flare". The sympton of this phenomenon is that if the image brightness is increased, the apparent size of bright objects in the field of view is increased. Qualitative tests with the NEC TI-22C CCD array camera have shown that flare is not important at low levels of exposure. Thus, if the brightness of the strip image is variable, then it is advisable to ensure that the image has a low exposure. For example, if the system produces digitized images with up to 256 levels of grey it may be necessary to ensure that the brightest object in the field of view has a grey level of say 50 or less.

6. VISION PROCESSING SYSTEM

In principle, any one of a large number of commercially available vision processing means can be used to collect, store and analyse the information provided by the camera. The main requirements are the ability to collect the video information sufficiently quickly that the spatial resolution of the camera is not degraded, and to digitise the information into a large range of numbers representing brightness or grey level. The digitiser used in the preferred system is made by Datacube, and is known as "Digimax". This digitiser operates at 10 MHz, and produces data with 256 levels of grey. That is, the signals from the individual elements are digitised into 256 levels each representing a shade of grey. Digimax accepts either RS-170 or CCIR signals. Systems which operate at frequencies lower than about 7 MHz are not able to accept RS-170 or CCIR signals. Some known systems produce data with less than 256 levels of grey. Such systems may be used in apparatus according to the invention, but would not give measurements as accurate as those provided by the Datacube digitiser, or other comparable digitisers.

Information from the digitiser is stored in a dedicated area of memory called a frame store. It is frequently the case that the digitiser and frame store are connected by an internal or dedicated bus (high speed communication link) which is separate from the main computer bus. In this case the frame store memory is known as dual ported RAM (Random Access Memory). Dual ported frame stores offer higher overall system speed, and would be preferred for those cases where the frequency of width and edge position determination of the strip must be rapid.

The computer 10 which accesses the information in the frame store can be any appropriate general purpose computer, but, in the interests of speed and ease of use, the computer should have a high clock speed, a powerful instruction set, and a linear address space large enough to allow direct access to a whole frame store (typically 256 k bytes) together with the main system memory. Thus computers based on so-called 8-bit processors are not suitable. The preferred system uses a Motorola single board computer based on a MC68000 central processing unit, which is capable of addressing up to 16M bytes. It would of course be not difficult for a skilled practitioner to design and construct a special purpose computer, optimised for the task of width measurement and edge tracking.

7. VIDEO LINK

Specially designed known coaxial cables are capable of transmitting video information over quite long distances (perhaps 100 m). Performance of this order is often required in a plant installation, particularly if the camera is attached to the roof structure of the building.

8. DISPLAY

The display unit 11 may be a terminal, having both a screen for displaying information and a keyboard for sending information, communicating with the computer 10 via a serial link (RS-232, RS-422, or current loop). Alternatively, the display unit may be a monitor linked to the vision processing components (rather than the general purpose computer) via a second video link.

9. MODE OF OPERATION

According to the invention an image of the strip is produced on the sensor array, transmitted by the camera as a video signal, and then converted to a digital signal which is stored in the computer. Usually the strip and background have sufficient contrast to produce respective bright and dark signals, but if that not be so a dark background may be provided at the camera location or the illumination of the strip adjusted to produce the required contrast. Each stored signal corresponds to one of the individual elements in the sensor array. The following operations are then performed by software routines.

First the data is transferred to an appropriately sized array in the computer memory, the files (rows and columns) of which correspond to those of the sensor elements and of the original picture captured by the camera. Each element in the array is an integer between 0 and 255, representing the amount of light captured by the corresponding sensor element. Summing all the horizontal rows (signals derived from files of sensor elements parallel to the axis of the sensor array parallel to the strip's edges) produces a linear array of summation values in which the values are allocated to positions corresponding to the positions along the perpendicular axis of the CCD array of sensor elements of the rows of elements from which the values were derived. Thus the positions of the summation values in the linear array are directly referable to positions on the perpendicular axis of the sensor element array. Therefore the linear array defines a derived "broad band scan" radiation profile.

Figure 5:
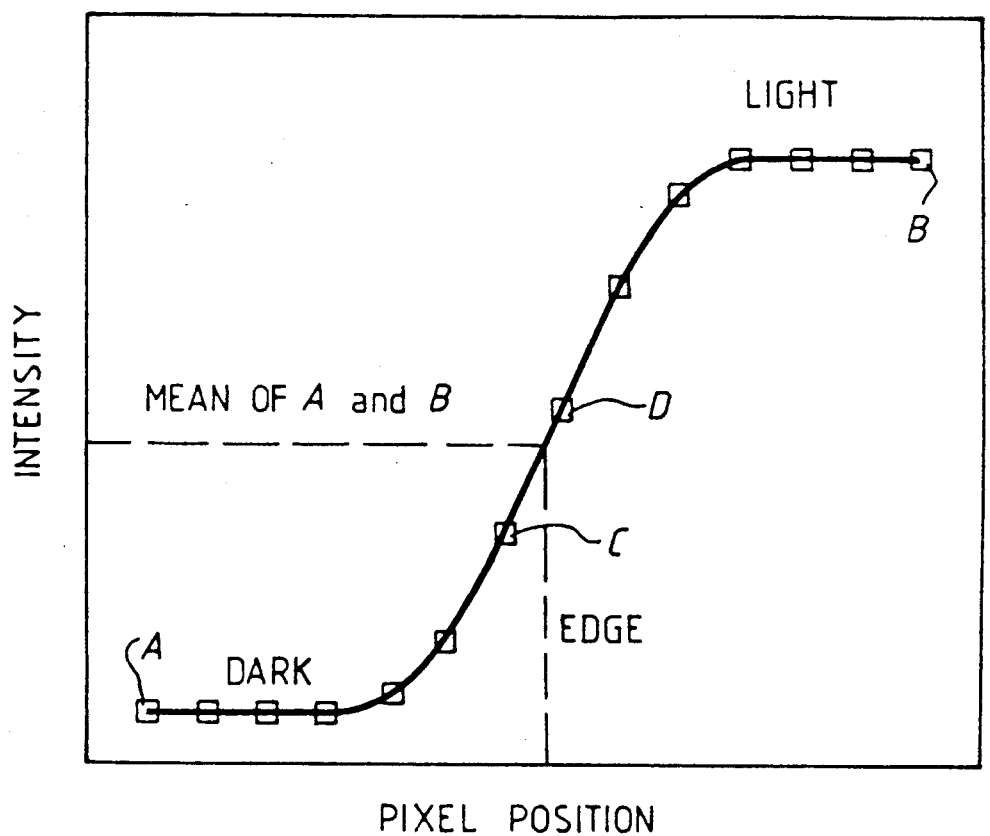
FIG. 5 is a plot of a large scale portion of a derived radiation profile relating to an edge of a feature applicable to any feature of either embodiment.

An approximate position algorithm recognizes the edges of the strip from that relatively small scale derived radiation profile, and passes the edge positions to a precise position algorithm. Further grey scale sums are calculated again, this time of signal referable to restricted areas closely covering the two edges of the strip 7, to produce futher linear arrays of summation values defining large scale derived radiation profiles relevant to the respective edges of the strip 7. Such a large scale profile is illustrated by FIG. 5. Straight line interpolation between the two plotted points C and D on either side of the mean value (halfway between the values A and B of the dark and bright plateaux respectively) gives the accurate position of the edge with reference to the perpendicular axis of the camera array. From the edge positions the strip width can be calculated with errors much less than the spacing between the original pixels. The actual position of the strip edge from a reference point can also be calculated.

The step of producing a one-dimensional summation values array or derived radiation profile by summation involves an enormous compaction of the video data (from say 256,000 data points, to only 512 data points). This compaction is very time-consuming, and would take about one second using an optimised assembler routine on the preferred vision processing system. If width measurement and edge tracking data are required more frequently, then the data from a previous set of measurements can be used to predict the approximate location of the edges for the next set of measurements. Thus only a small fraction of the initial 256,000 data points then have to be considered, eliminating the need to determine the values of an initial small scale radiation profile.

It is even possible to reduce the number of signals processed to those from only four files of sensor elements for each edge. Namely, (see FIG. 5), a single file receiving radiation from well away from the edge region to establish a dark reference value A; a complementary file to establish a bright reference value B; and two files generating signals summing to values C and D, on either side of the mean intensity level, to establish the local radiation profile at the edge itself.

Whether the total number of signals summed is reduced to those from about 8 files, or to some number of files intermediate 8 and 512, the result is to reduce the number of summing operations that have to be performed, and hence to reduce the time needed for summing. Consequently, the time taken for the edge and width calculations can be reduced to much less than one second. However, if CCIR or RS-170 video formats are used, then a minimum time of 20 ms. (CCIR) or 16.7 ms. (RS-170) (which is the field update period) is needed to obtain a new set of video data.

10. CALIBRATION

Calibration of the apparatus may be achieved with the aid of a special test piece, which is held in the plane of the strip pass line. One possible configuration for the test piece is a sheet marked with alternate light and dark bands. In use, the bands would lie approximately parallel to the strip rolling direction. For preference, the bands should be of the same width, or all the light bands should be one width and all the dark bands another width. The positions of the centres of the dark bands can be measured using the invention by taking the average of the two dark band edge positions. Measurements of this type are immune to flare. The perceived spacings between the centres of the dark bands can be used to generate calibration constants across the field of view of the camera, and hence can be used for absolute calibration of the instrument, and for correction of barrel distortion and other distortion produced by the lens.

11. APPLICATIONS

One application of a width measurement and edge tracking system according to this invention is on a continuous production line where the edges of the strip are being trimmed to reduce the total strip width to a precisely known desired value. If the edges of the strip can be tracked, and if the line has adequate control of strip tracking, then the invention allows the desired width to be produced by trimming only one edge.

In an operation where one or both edges of a strip are being trimmed, the field of view of the system can include the strip before trimming, the slitter, and the strip after trimming. Suitable software can allow the strip width and the edges to be measured simultaneously, by the same camera, frame grabber and data processor, both before and after trimming. Such a modification allows more positive control of the whole operation.

In another application, the widths of the individual slit strips produced by a slitting line can be measured.

A second embodiment of the invention as applied to non-contact extensometry, that is to say the determination of the changes in length and width of a test specimen as testing proceeds, is now described in relation to the testing of a sheet steel specimen, with reference to FIGS. 2, 3, 4 and 5.

In this instance the apparatus of the invention not only indicates the dimensions of the test piece but also transmits that information to a second computer which controls the operation of the testing machine itself.

Figure 2:
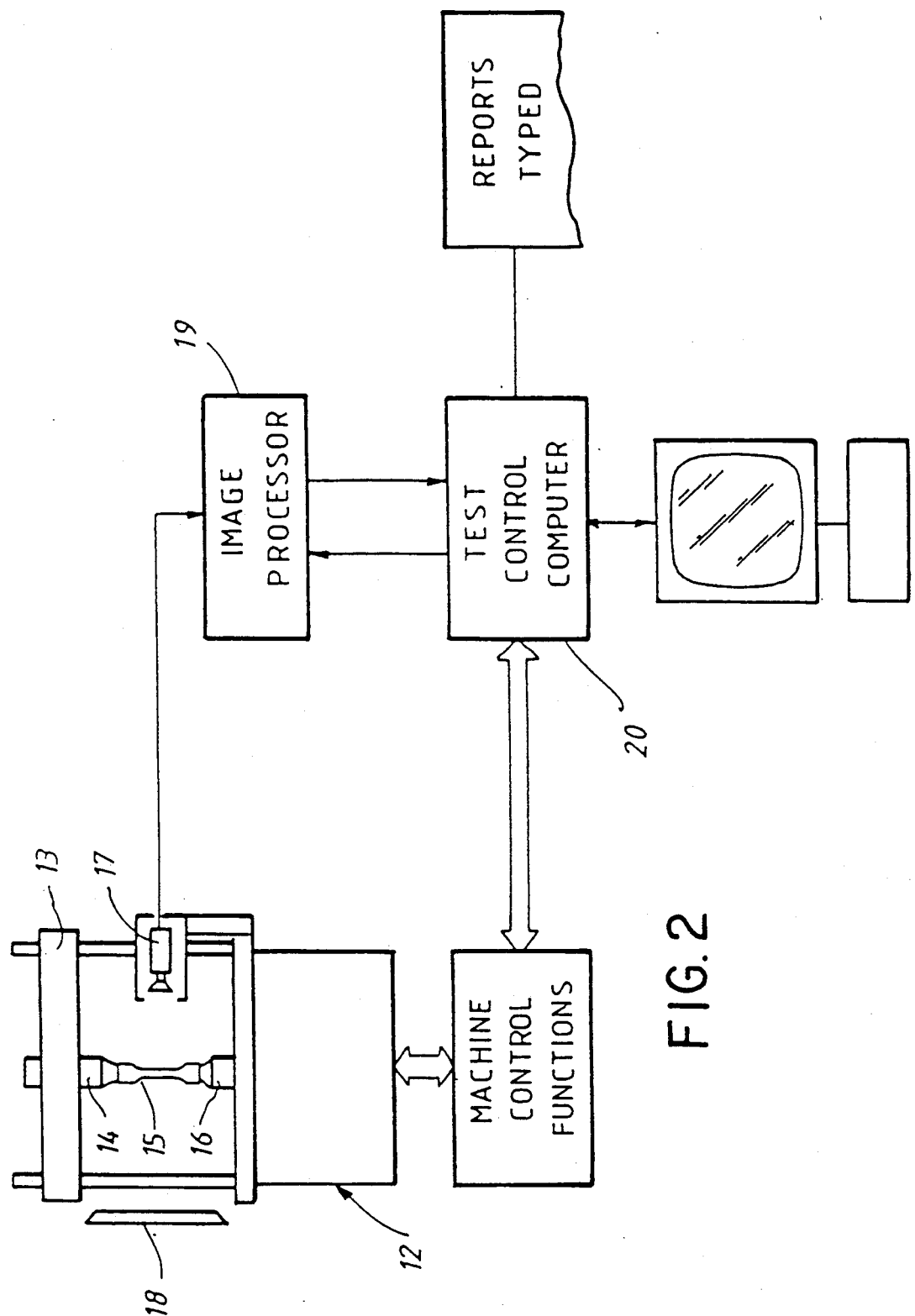
FIG. 2 is a schematic diagram showing a simplified version of an apparatus for detecting dimensional changes in a tensile test piece as testing proceeds.

The apparatus, as seen in FIG. 2, comprises a tensile testing machine 12, comprising a rigid frame 13 supporting a fixed clamp 14 gripping one end of a test piece 15 and a downwardly moveable clamp 16 gripping the opposite end of the test piece. In use the clamp 16 moves to stretch and ultimately snap the test piece 15. The machine 12 is essentially conventional and needs no further description herein. However, in accordance with the invention a CCD camera 17, preferably within a protective housing, is mounted on the frame 13 in a position where it may be focussed on the test piece 15. Also, a contrasting screen 18 may be mounted behind the test piece to enhance the definition of the upright edges of the test piece for the camera and to provide a constant uniform background for the test piece.

The testing machine 12 strains the test piece 15 at a constant rate while recording the load and the apparatus of the invention determines the dimensions of the gauge area of the test piece. Each test normally takes about three minutes, and ideally the load and dimensions are recorded every frame period (40 ms., CCIR). The conventional method of measuring gauge dimensions (the central gauge length and width shown in FIG. 3) involves attaching contact length and width extensometers to the test piece. Unfortunately, the reliable attachment of contact extensometers requires a skilled operator, so, in practice, most tests are performed without the use of extensometers. The movement of the moveable clamp of the testing machine is known, of course, and this movement, coupled with a model of the way in which a typical test piece deforms, can be used to provide a reasonably accurate estimate of the actual gauge length.

However, such routine tests give no information about the change in gauge width. An important parameter of steel, namely, the plastic strain ratio or r-value, can be determined only if both the gauge length and the gauge width are measured. The invention enables these measurements to be readily obtained. Further, the inventive method does not involve a high level of operator skill, and so is suitable for routine testing.

There are three items or regions of interest in a stress-strain curve: yield or proof stress, the region of uniform strain, and the total elongation at fracture. The measurement of proof stress depends upon collecting data points quickly enough to establish the slope of the elastic portion of the curve. At a conventional strain rate, say, about $3.0 \times 10^{-3}$ s$^{-1}$, length measurements should be collected at least every 60 ms. with a reproducability of 0.01%. In the uniform elongation regime, both the length and the width of the central gauge area are required every 1.0 s or so, in order to determine the r-value. Failure of the test piece usually occurs by necking, and the necked region must be included in the gauge length that is used for determining total elongation. Since necking may occur quite near the shoulders of the test piece (FIG. 3), two additional gauge lengths are needed to cover these areas. Total elongation is calculated from the gauge length which has extended most at failure.

Thus the apparatus is preferably able to measure the three gauge lengths and the central gauge width every 40 ms. to an accuracy of 0.01%. Although this requirement is more stringent than the minimum requirement for each of the regions of interest, it has the advantage that just one algorithm is needed to satisfy it, and that modifications to conventional automated tensile testing programs are minimal.

The CCD camera 17 may be the same as that of the first described embodiment, except for appropriate selection of a lens to suit the camera to test piece distance.

Video data from the camera 17 is transmitted to an image processor 19 comprising a frame grabber and data processor as in the first-described embodiment including a real time image digitiser which has four 256 k byte frame stores and produces signals representing 256 grey levels. Processing may be accomplished by two single board computers with 8 MHz 68000 CPUs. Two computers are needed to share the calculations to allow completion within say 20 ms., and handle communication with an automated tensile testing computer 20.

The computer 20 receives the determined length measurements from the vision processor 19 and controls ancillary equipment which prints out or plots them as needed.

It also converts the digital values back to analogue signals for transmission to hardware for the functional control of the testing machine 12.

The geometry of the test piece (FIG. 3) is very simple, with the test piece edges being nearly aligned with the co-ordinates of the sensor array, that is with the pixel axes. The test piece is prepared with accurately spaced transverse inked or other lines 21, the centres of which correspond to the gauge length and the edges of which define the transverse "features" of which the position is determined. The position of each edge of each line 21 is determined and the intermediate position mid-way between them is then calculated as the definitive result. This procedure increases the statistical accuracy of the determination. The test piece may be either light (with a dark background and dark lines) or dark (with a light background and light lines).

An initialisation procedure ensures that the background is uniform, that the image is neither under-exposed nor over-exposed, that there is adequate contrast between the test piece and the background, that the test piece is correctly positioned, and that the spacing of the lines and the width of the test piece are correct. These well defined starting conditions allow the length and width measurement algorithms to be simple and fast.

If the grey scale values of the signals from the sensor elements in each row of the CCD array are summed and the summation values stored as the elements of a one-dimensional array (one value for each row as in the first embodiment and as indicated by the small scale radiation profile to the right of FIG. 4), then no information is lost about the vertical position of the ink marks in spite of the enormous compaction of the data. A similar statement is valid for summing the columns.

An enlarged radiation profile across a feature region (that is an edge of the test piece or an edge of one of the marks thereon) plotted from the linear array of the totals of the grey values of the respective files of CCD elements is essentially the same as the profile illustrated by FIG. 5 in relation to the first described embodiment and the position of the feature may be determined in the same way as before. Indeed the simple two point interpolation is particularly appropriate for non-contact extensometry. Any misalignment between the CCD array co-ordinate axes and the features of the test piece will result in a smearing of the indications of the edges in the summation arrays. Provided the misalignment produces a smearing of only a few pixels, there is no loss of measurement accuracy, but the central section of the radiation profile is fitted best by a straight line. Since this section has a uniform gradient, an edge detection algorithm which searched for a point of maximum gradient would not be as accurate for edge measurement.

As mentioned earlier, causing the system to remember the results of the last set of feature measurements, and assuming that the features do not move far between measurements, permits even more compaction of the data. FIG. 4 shows by broken lines small regions around the feature edges of which the positions have to be periodically determined. In the standardised testing situation the initial summation operations may be readily confined to signals from these small areas, and ignoring the rest retains all the useful information while discarding the overwhelming majority of the video data.

As in the first described embodiment even more compaction is possible, as the only grey scale summation points actually needed are a bright reference, a dark reference, and the two points of the radiation profile immediately on either side of the mean.

As mentioned earlier, the files of sensor elements in the solid state array of a CCD device are separated by dead bands, that is to say bands which are not radiation sensitive. Thus, insofar as described above the invention admits of the possibility of the image of the feature falling directly upon and along a dead band. Should that happen, the signals received from the files of elements disposed immediately adjacent that dead band are indeterminate to the extent that neither is affected by variations in the position of the image provided it remains wholly within the dead band. This reduces the accuracy of the final determination, although in many applications not to an unacceptable level. In some instances however, where the highest accuracy is desired, the method of the invention may be modified or refined as follows.

The radiation responsive sensor may be de-focussed so as to blur the image falling on the solid state array of elements over about one element spacing.

Alteratively or as well, the alignment of the array may be deliberately set so that its co-ordinate axes are substantially but not exactly parallel or perpendicular, as the case may be, to the feature of the article, typically the image of the feature may be skewed across from four to ten, preferably say five or six, files of sensor elements of length of say two hundred elements, and the feature treated as if it were broken up into segments. This may be accomplished by treating the files of sensor elements substantially parallel to the feature as being correspondingly broken up and producing summation values in respect of each segment. A position indication, that is to say a positional value on the perpendicular axis, is then obtained for each segment of the feature by the method of the invention already described and an arithmetical average value of those segment positional values is adopted as the position of the feature itself.

When determining each segment position, interpolation (or extrapolation) is determined with reference to a mean value equal to the mean of the bright and dark plateaux values multiplied by the number of sensor elements in the segment and divided by the total number of elements in each file, and the average of the segment positions is calculated as a weighted average, with greater weight being given to longer segments, if the segment lengths are not all the same.

For example, if in a particular CCD device each file comprises one hundred and five sensor elements, the segment sums may be calculated for nine segments each ten elements long and a tenth segment fifteen elements long. Segment positional values ($P_1$, $P_2$ . . . $P_{10}$) for corresponding pairs of ten element segments would be determined with reference to a mean value of 10/105 of the full value, and a position for the tenth segment element with reference to a mean value of 15/105 of the full value. The position of the feature edge on the perpendicular axis is then calculated as $(10P_1 + 10P_2 + \ldots + 15P_{10})/105$.

We claim:

1. A method of determining the position of a rectilinear edge between relatively bright and dark zones of a target area, comprising the steps of:
   (a) selecting a video camera of the kind comprising a matrix of individual, radiation-responsive elements disposed in equally spaced apart parallel rows, with the elements of each row equally spaced apart in the direction of the row and transversely aligned with corresponding elements of the other rows, and lens means to project an image of the camera's field of view onto said matrix;

(b) fixedly positioning the camera relative to said target area to ensure that the camera's field of view includes a substantial length of said edge;

(c) aligning the camera so that the image of said length of said edge projected onto the matrix extends longitudinally of and lies within a band of the matrix comprising no more than ten neighboring rows of elements;

(d) summing the signals produced by at least some of the elements of each of a plurality of selected rows of elements, the selected rows being at least those rows on which said image of said length of said edge lies and at least one row on each side thereof, to derive a summation value for each of said selected rows; and (e) calculating the position of said image of said length of said edge with respect to the matrix utilizing said summation values and thereby determining the position of said edge with reference to said field of view.

2. A method according to claim 1 wherein said step of calculating the position of said image of said length of said edge is effected by allocating said summation values to positions in a linear array corresponding to the positions in the matrix of the respective rows of elements, determining the mean value of two of said summation values which are, respectively, a high value derived from one of said selected rows of elements at one side of said image of said length of said edge and spaced therefrom and a low value derived from another of said selected rows of elements at the other side of said image of said of said length of said edge and spaced therefrom, and thereafter determining a position in said linear array corresponding to a value equal to said mean value.

3. A method according to claim 2 wherein said step of determine a position in said linear array corresponding to said mean value is effected by the straight line interpolation of said mean value between the positions in said array of two of said summation values which are the nearest value higher than said mean value and the nearest value lower than said mean value respectively.

4. A method according to claim 2 wherein said step of determining a position in said linear array corresponding to said mean value is effected by determining the position in said array of a value equal to said mean value and lying on the line of best fit with respect to a plurality of said summation values progressively increasing in value above said mean value and a plurality of said summation values progressively decreasing in value below said mean value.

5. A method according to claim 1 further comprising the step of calibrating said linear array by recording a position with respect to said matrix of an image of a said edge of known location with reference to said target area.

6. A method according to claim 2 further comprising the step of storing in a memory a position of said image of said length of said edge with respect to said matrix.

7. A method according to claim 6 further comprising the steps of recalling the stored position from memory and re-determining the position of said image of said length of said edge utilizing summation values derived from selected rows of elements adjacent to the recalled position.

8. A method according to claim 2 wherein the rectilinear edge is an edge of an elongate article moving along a processing line.

9. A method according to claim 8 further comprising the step of controlling the operation of the processing line in response to variations in the determined position of the edge.

10. A method according to any one of claims 1 or 2 wherein the position of a second said edge within the same target area is determined simultaneously.

11. A method according to claim 10 wherein the target area includes a sheet metal tensile test specimen and the respective edges define a gauge length thereof.

12. A method according to any one of claims 1 or 2 wherein the relative brightness and darkness of the zones is with reference to infra-red radiation and the camera's radiation-responsive elements are responsive to that radiation.

13. A method according to any one of claims 1 or 2 further comprising the step of defining said zones on the surface of an article by pre-treating the surface to provide zonal areas having contrasting radiation reflection characteristics.

14. A method according to claim 2 wherein the step of calculating the position of said image of said length of said edge is effected by calculating respective positional values for discrete segments of that image and then calculating the length weighted average of the segment positional values.

15. A method according to claim 1 wherein said image of said length of said edge is skewed across from four to ten rows of said band.

16. A method according to claim 2 wherein the camera is not sharply focused on the target area so that said image of said length of said edge has a blurred width substantially equalling the row spacing of said matrix.

17. Apparatus for determining the position of a rectilinear edge between relatively bright and dark zones comprising:

a video camera of the kind comprising a matrix of individual radiation-responsive elements disposed in equally spaced parallel rows, with the elements of each row equally spaced apart in the direction of the row and transversely aligned with corresponding elements of the other rows, and lens means to project an image of the camera's field of view onto said matrix;

camera mounting means for positioning the camera so that a substantial length of the edge is included in the field of view and for aligning the camera so that that the image of said length of said edge extends longitudinally of and lies within a band of the matrix comprising no more than ten neighboring rows of elements, a frame grabber for digitizing signals generated by said elements and capturing frames of the digitized signals, and data processing means for processing the captured signals;

wherein said data processing means sums the signals derived from at least some of the elements of each of a plurality of selected rows of elements, the selected rows being at least those rows on which said image of said length of said edge lies and at least one row on each side thereof, allocates the summation values for each of said selected rows of elements to positions in a linear array corresponding to the positions in the matrix of the respective rows of elements, determines the mean value of two of said summation values, being respectively a high value derived from one of said selected rows of elements at one side of said image of said length of said edge and spaced therefrom and a low value derived from another of said selected rows of elements at the other side of said image of said length of said edge and spaced therefrom, and thereafter determines a position in said linear array corresponding to a value equal to said mean value.

* * * * *

UNITED STATES PATENT AND TRADEMARK OFFICE
CERTIFICATE OF CORRECTION

PATENT NO. : 5,033,096

DATED : July 16, 1991

INVENTOR(S) : Bruce R. Morrison, et al

It is certified that error appears in the above-identified patent and that said Letters Patent is hereby corrected as shown below:

Column 13, line 38, delete "of said", first occurrence.

Column 14, line 54, delete "that".

Signed and Sealed this

Eleventh Day of February, 1992

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 5,033,096

Page 1 of 9

DATED : July 16, 1991

INVENTOR(S) : Bruce R. Morrison, et al

It is certified that error appears in the above-identified patent and that said Letters Patent is hereby corrected as shown below:

Columns 1 - 16 should be deleted and replaced with attached columns 1-16.

This certificate supersedes Certificate of Correction issued February 11, 1992.

Signed and Sealed this

Sixteenth Day of February, 1993

Attest:

STEPHEN G. KUNIN

*Attesting Officer*     Acting Commissioner of Patents and Trademarks

NON-CONTACT DETERMINATION OF THE POSITION OF A RECTILINEAR FEATURE OF AN ARTICLE

FIELD OF THE INVENTION

This invention relates to the determination of the position of a rectilinear feature of an article by means making no physical contact with the article. More particularly, the invention is concerned with making such determinations by electro-optical means which determine the position of an abrupt rectilinear change in the brightness of a field of view coinciding with the feature of the article. The feature may, for example, be a straight edge of the article appearing against a contrasting or differently illuminated background or it may be a straight junction line between differently inclined or contrastingly conditioned or coloured zones of the surface of the article.

The determination may be made to enable the location of the article with reference to its environment to be ascertained, and maybe controlled. For example, the tracking of an edge of a strip, sheet, web, bar or other article passing along a continuous production or treatment line, or of a belt or other conveyor for such an article, may be monitored by apparatus according to the invention for the control of the process.

Alternatively the positions of two or more spaced apart features may be determined to enable the distance between them, and thus a dimension of the article to which they relate, to be determined. For example, the edges of rectilinear indicia on a tensile test piece may be observed and the distances between them determined at intervals as testing proceeds, to enable the properties of the material of the piece to be established.

The invention has application in the steel making industry for edge tracking and/or measuring the width of steel strips during production operations such as rolling. Likewise it may be applied to the paper making industry for the control of printing or other operations on moving webs or the like. The invention also has application to the trimming of strips to reduce the strip width to a precisely known desired value. In these applications it is necessary to accurately position one or both edges of a moving strip for width measurement and/or guiding purposes. The invention is also well suited for the non-contact extensometry of steel or other test pieces.

DESCRIPTION OF THE PRIOR ART

Determinations of the kind in question have been effected by utilising one or more video cameras to observe the article or articles, coupled with processing means to extract the required information from the video image or image signals.

U.K. Patent No. 1,271,990 discloses an early proposal in which a dimension is read more or less directly from the video image produced by a (presumably) vidicon camera. That early proposal is not capable of producing results of an acceptable accuracy for most practical purposes.

E.P. Nos. 29,748 and 94,522 and U.S. Pat. No. 4,499,383 disclose more sophisticated arrangements utilising at least one, more stable and inherently more accurate, charge coupled device (CCD).

These last mentioned prior proposals utilise signals from a line scan across the article to produce a linear array of values from which, in these instances, the positions of the edges of the article are derived.

As the individual values of the linear array are derived from the radiation from equally spaced apart points on the scanning line they could be plotted as a curve of radiation intensity against distance, that is to say as a radiation profile taken along the scan line. It is usually unnecessary to plot such a curve as the required information may be extracted from the values arithmetically, but it will facilitate comprehension of the following description if it is borne in mind that such a linear array of values effectively defines such a profile having a distance scale determined by the spacing of the sensor elements in the matrix of elements of a CCD camera.

Such prior known techniques produce information about a single cross-section of the article and may lead to misleading results if the particular cross-section is not typical, for example if the scanning line happens to coincide with a minor edge defect or a localised variation in radiation emission or reflection characteristics affecting the input radiation received by the CCD, and thus the output signals produced by it. Furthermore the individual values of the linear array derived from a line scan are affected by random errors in the signals from the individual radiation responsive elements of the CCD, due, for example to background electrical "noise" or quantum errors. Such errors may easily amount to 4 or 5 units in signals of the order of from 0 to 256 units and may seriously degrade the final results.

Another defect of the prior proposals is their reliance on determining the point of maximum slope of the radiation profile defined by the array of values to locate the position of the abrupt change in the brightness of the field of view and thus, the position of the corresponding feature of the article. This is unsatisfactory not only because of the complex, and therefore slow, data processing involved but also because, in practice, the maximum slope often extends without appreciable change for a considerable profile length, making a precise point determination impossible. E.P. No. 29,748 proposes to overcome that difficulty by locating points to each side of the point of maximum slope of a predetermined lesser slope and interpolating to find the nominal point of maximum slope, but this further complicates, and thus further slows, the data processing, which is detrimental if successive readings are rapidly required for the effectively continuous monitoring of, say, a moving strip or web.

SUMMARY OF THE INVENTION

An object of the invention is to provide a method and apparatus utilising a camera with a radiation-responsive sensor of the kind comprising a solid state matrix of radiation sensitive elements arranged in rows and corresponding in number and disposition to the pixels of a video image, for determining the position of a rectilinear feature of an article causing or constituting an abrupt change in the brightness of the camera's field of view, which overcomes or at least alleviates the deficiencies of the prior art discussed above.

The invention achieves that object primarily by providing a method wherein the defined radiation profile from which the determination of position is made is derived not from signals from a row of elements perpendicular to the feature, as in the prior art, but from the totals obtained by summing the signals from the elements of each of a plurality of rows of elements parallel to the feature. Thus the values of the linear array defining the radiation profile are individually representative of a substantial length of the feature of the article being observed.

Putting it another way, one may say, whereas the prior art uses data derived from a line scan, the invention captures different data and processes it to obtain the effect of what could be termed a broad band scan, from which considerable benefits accrue.

As the noise errors in the signals from each element of the CCD are truly random the summing process largely cancels them out and as each summation value is derived from individual signals corresponding to many points along a length of the feature, localised abnormalities therein do not have a substantial effect on the value.

Preferred embodiments of the invention also provide for a simple but effective method of processing of the summation values to define a derived radiation profile and to locate the point thereon corresponding to the feature of the article.

According to one aspect the invention consists in a method of determining the position of a rectilinear edge between relatively bright and dark zones of a target area comprising the steps of selecting a video camera of the kind comprising a matrix of individual radiation-responsive elements disposed in equally spaced apart parallel rows, with the elements of each row equally spaced apart in the direction of the row and transversely aligned with corresponding elements of other rows, and lens means to project an image of the camera's field of view onto said matrix; fixedly positioning the camera relative to said target area to ensure that the camera's field of view includes a substantial length of said edge; aligning the camera so that the image of said length of said edge projected onto the matrix extends longitudinally of and lies within a band of the matrix comprising no more than ten neighbouring rows of elements; summing the signals produced by at least some of the elements of each of a plurality of selected rows of elements, being at least those rows on which said image of said edge lies and at least one row on either side thereof, to derive a summation value for each of said selected rows; calculating the position of said image of said length of said edge with respect to the matrix utilising said summation values and thereby determining the position of said edge with reference to the field of view.

According to a second aspect the invention consists in apparatus for effecting the method of the invention comprising a video camera of the kind comprising a matrix of individual radiation-responsive elements disposed in equally spaced parallel rows, with the elements of each row equally spaced apart in the direction of the row and transversely aligned with corresponding elements of the other rows, and lens means to project an image of the camera's field of view onto said matrix, camera mounting means positioning the camera so that a substantial length of the edge is included in the field of view and aligning the camera so that the image of said length of said edge extends longitudinally of and lies within a band of the matrix comprising no more than ten neighbouring rows of elements, a frame grabber to digitise the signals generated by said elements and to capture frames of the digitised signals, and data processing means to process the captured signals; said data processing means summing the signals derived from at least some of the elements of each of a plurality of selected rows of elements, being at least those rows on which said image of said length of said edge lies and at least on row on either side thereof, allocating the summation values for each of said selected rows of elements to positions in a linear array corresponding to the positions in the matrix of the respective rows of elements, determining the mean value of two of said summation values, being respectively a high value derived from one of said selected rows of elements to one side of said image of said length of said edge and spaced therefrom and a low value derived from another of sa' ' selected rows of elements to the other side of said image of said length of said edge and spaced therefrom, and thereafter determining a position in said linear array corresponding to a value equal to said mean value.

It will be noted that in the foregoing description of the invention the ultimate result is an indication of the position of the feature with reference to a co-ordinate axis of the sensor's array of elements. That of course corresponds to the position of the feature as it would be seen in a normal video image. This is because the apparatus is dealing with derived information or video images and may only directly indicate the position of one point of a video image relative to the image as a whole. If an absolute determination of the position or dimension of an article is required it is necessary to calibrate the apparatus beforehand by determining the indicated positions of the features of a test article of known location and dimensions and thereafter comparing the respective indications.

For preference, the camera is a high resolution CCD type video camera. Such solid state cameras have several advantages over conventional cameras based on video tubes. For example, the signal output from the individual elements is directly proportional to the light gathered, the image cannot be burnt into the elements, and the positions of the elements in the matrix are very accurately defined by the manufacturing process.

The individual captured signals corresponding to each frame of video signals are preferably digitised by the frame grabber and transmitted to and stored in the memory of a computer. Software routines controlling that computer may then be used to effect the summations and determine the required position of the edge.

The location of the edge is preferably determined by first using an approximate position algorithm and then using a straight line interpolation between two summation value points on the derived radiation profile an equal number of points from and on opposite sides of the point corresponding to the mean value of two remote summation values respectively received from the bright and dark zones of the field of view.

Preferably the interpolation is made between the two summation value points above and below and nearest to the means value point. It will be appreciated however that any appropriate interpolation technique may be used. In particular, it may be preferred to derive a curve of "best fit" for the summation values and use that curve, instead of the actual plot of those values, as the derived radiation profile.

By way of example, two embodiments of the invention are described hereinafter with reference to the accompanying drawings.

BRIEF DESCRIPTION OF THE DRAWINGS

FIG. 1 is a schematic diagram showing a simplified version of the apparatus for detecting the positions of the edges of a moving strip.

FIG. 2 is a schematic diagram showing a simplified version of an apparatus for detecting dimensional changes in a tensile test piece as testing proceeds.

Figure 3:
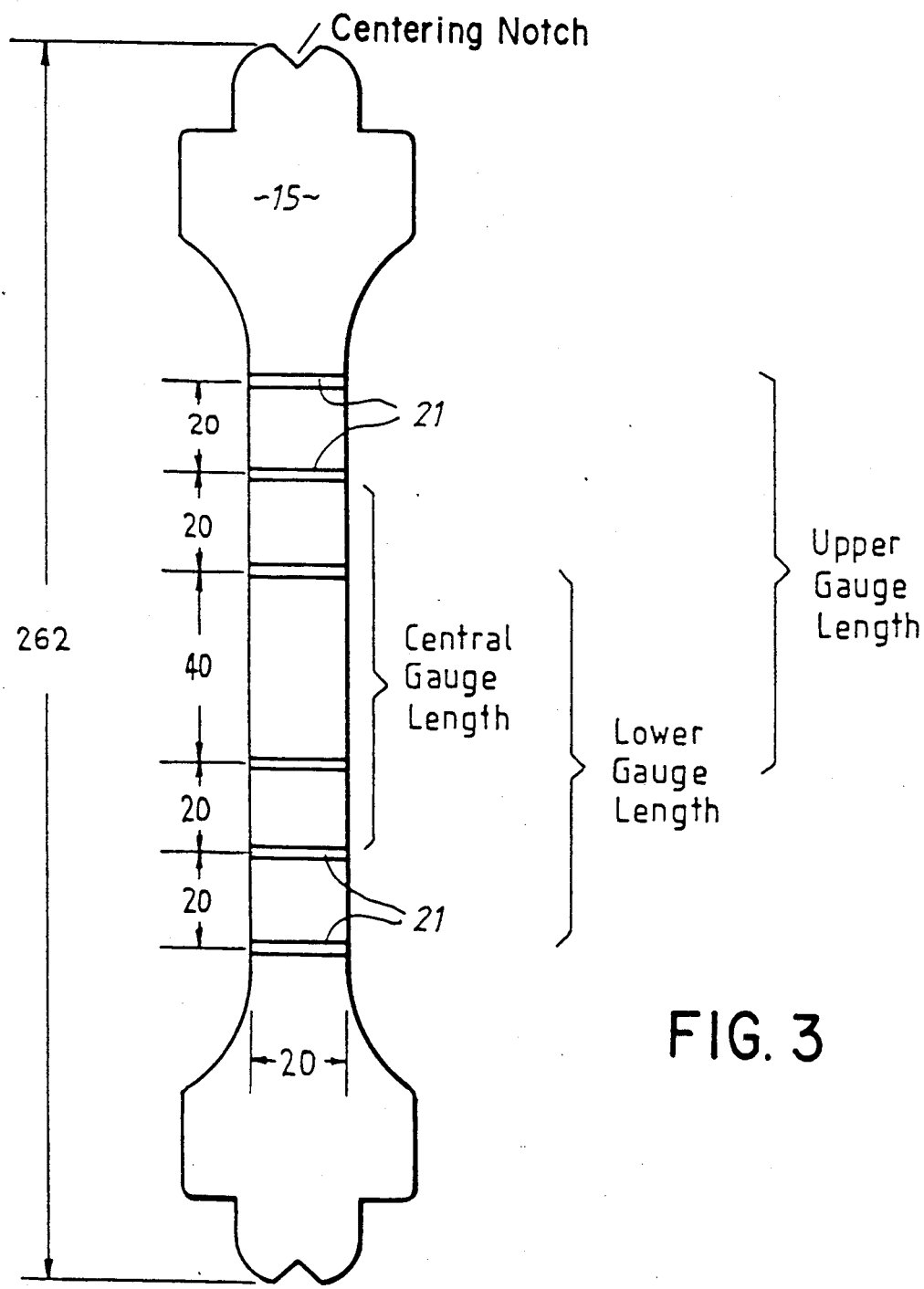
FIG. 3 is a front elevation of a sheet metal test piece showing pigmented markings applied to it to define rectilinear features thereon.

FIG. 3 is a front elevation of a sheet metal test piece showing pigmented markings applied to it to define rectilinear features thereon.

FIG. 4 is a representation of the field of view of a CCD camera including the test piece of FIG. 3 and showing two relevant small scale derived radiation profiles.

FIG. 5 is a plot of a large scale portion of a derived radiation profile relating to an edge of a feature applicable to any feature of either embodiment.

DESCRIPTION OF THE PREFERRED EMBODIMENTS

In relation to FIG. 1 the invention is described as applied to a strip width measurement and edge tracking system for steel strip continuously produced by a rolling mill.

That strip width measurement and edge tracking system comprises a solid state video camera and lens combination 6 appropriately positioned with respect to the strip 7 and connected via a video link 8 to a frame grabber 9 comprising a digitiser and frame store. The frame grabber 9 is interfaced with an appropriate computer 10 which is connected with a terminal or monitor 11. The components and design criteria of the system are described in more detail below under their respective headings.

1. CAMERA

The preferred solid state array camera consists of two-dimensional orthogonal array of individual radiation responsive elements, each of which gives a voltage signal proportional to the incident light intensity. The sensing elements have a well defined reception area, and there are well defined dead bands or tracks separating them. The array of elements is formed on a monolithic substrate using photolithographic processes, and forms an extremely regular and highly stable system.

A suitable camera is any commercially available solid state array camera having high light sensitivity, high resolution and preferably one with a guarantee of no dead pixels.

2. LENS

Ideally the lens is of high quality, to minimize distortion, and of long focal length. Errors will be caused by barrel distortion, movement of the strip pass line, tilting of the strip towards one edge, and deviation of the camera axis from the perpendicular to the strip. All of these errors are minimized by having a long focal length lens. For 1 m wide strip, barrel distortion becomes insignificant if the camera is more than about 20 m from the strip. This entails that the focal length of the lens should be 200 mm in order to provide a field of view that is occupied substantially by the strip, but which also overlaps the strip edges significantly. Lenses of shorter focal length can be tolerated, allowing the system to operate substantially closer to the strip than 20 m, but a correction for barrel distortion would have to be calculated, and the effects of pass line movement would be more significant.

3. CAMERA ORIENTATION WITH RESPECT TO THE STRIP

CCD array cameras have electronic hardware that turns the image held by the individual elements in the sensor array into a stream of video information. Normally, and for preference, this video stream follows the rules set down in television standards such as RS-170 (North America) and CCIR (Australia, Japan and parts of Europe). However, the rate at which the video information is generated does depend to a small degree on the temperature of the controlling clock, (in practice, the ambient temperature of the camera surrounds). In an environment such as a steel mill which is not air conditioned, variations in temperature can cause a small variation in the rate of information generation, and hence an apparent change of the size of an object in the field of view. The video stream sends information from the two-dimensional orthogonal array of horizontal and vertical rows one horizontal row at a time. At the end of each row there is a synchronization pulse which acts as a terminator for the old row and an initiator for the new row. Thus the whole frame of information corresponding to a single full image is not sent as a single block, but as a series of concatenated rows. As a result, errors in measurement due to variations in clock speed occur only in dimensions which lie along a horizontal row, and not in dimensions which lie along a vertical row. It follows that it is the scanning (horizontal row) direction of the camera which is preferably aligned to the strip edge.

4. ILLUMINATION

CCD cameras are more sensitive to light than cameras based on tubes, and in most instances the ambient lighting conditions at the measurement station would allow adequate images to be collected. However, there can be some special circumstances where either additional illumination is required, or where some special precautions have to be taken. For example, if the change in ambient lighting between day-time and night-time is very large, then either additional lighting will be required, or a lens is required which has electronic aperture control. Another special case is where part of the strip may be strongly illuminated, while other parts are in shadow. Strong local lighting over the whole strip width, possibly associated with screens against the uneven source of illumination, would be required to ensure correct operation of the device.

In the case of strip hotter than about 500° C., thermal radiation from the strip surface may obviate the need for any form of external illumination. It may be necessary to provide the camera with an infra-red filter, in order to avoid excessive blurring of the strip image.

5. IMAGE EXPOSURE

Video cameras, whether based on tubes or solid state arrays, are subject to a phenomenon called "flare". The sympton of this phenomenon is that if the image brightness is increased, the apparent size of bright objects in the field of view is increased. Qualitative tests with the NEC TI-22C CCD array camera have shown that flare is not important at low levels of exposure. Thus, if the brightness of the strip image is variable, then it is advisable to ensure that the image has a low exposure. For example, if the system produces digitized images with up to 256 levels of grey it may be necessary to ensure that the brightest object in the field of view has a grey level of say 50 or less.

6. VISION PROCESSING SYSTEM

In principle, any one of a large number of commercially available vision processing means can be used to collect, store and analyse the information provided by the camera. The main requirements are the ability to collect the video information sufficiently quickly that the spatial resolution of the camera is not degraded, and to digitise the information into a large range of numbers representing brightness or grey level. The digitiser used in the preferred system is made by Datacube, and is known as "Digimax". This digitiser operates at 10 MHz, and produces data with 256 levels of grey. That is, the signals from the individual elements are digitised into 256 levels each representing a shade of grey. Digimax accepts either RS-170 or CCIR signals. Systems which operate at frequencies lower than about 7 MHz are not able to accept RS-170 or CCIR signals. Some known systems produce data with less than 256 levels of grey. Such systems may be used in apparatus according to the invention, but would not give measurements as accurate as those provided by the Datacube digitiser, or other comparable digitisers.

Information from the digitiser is stored in a dedicated area of memory called a frame store. It is frequently the case that the digitiser and frame store are connected by an internal or dedicated bus (high speed communication link) which is separate from the main computer bus. In this case the frame store memory is known as dual ported RAM (Random Access Memory). Dual ported frame stores offer higher overall system speed, and would be preferred for those cases where the frequency of width and edge position determination of the strip must be rapid.

The computer 10 which accesses the information in the frame store can be any appropriate general purpose computer, but, in the interests of speed and ease of use, the computer should have a high clock speed, a powerful instruction set, and a linear address space large enough to allow direct access to a whole frame store (typically 256 k bytes) together with the main system memory. Thus computers based on so-called 8-bit processors are not suitable. The preferred system uses a Motorola single board computer based on a MC68000 central processing unit, which is capable of addressing up to 16M bytes. It would of course be not difficult for a skilled practitioner to design and construct a special purpose computer, optimised for the task of width measurement and edge tracking.

7. VIDEO LINK

Specially designed known coaxial cables are capable of transmitting video information over quite long distances (perhaps 100 m). Performance of this order is often required in a plant installation, particularly if the camera is attached to the roof structure of the building.

8. DISPLAY

The display unit 11 may be a terminal, having both a screen for displaying information and a keyboard for sending information, communicating with the computer 10 via a serial link (RS-232, RS-422, or current loop). Alternatively, the display unit may be a monitor linked to the vision processing components (rather than the general purpose computer) via a second video link.

9. MODE OF OPERATION

According to the invention an image of the strip is produced on the sensor matrix, transmitted by the camera as a video signal, and then converted to a digital signal which is stored in the computer. Usually the strip and background have sufficient contrast to produce respective bright and dark signals, but if that not be so a dark background may be provided at the camera location or the illumination of the strip adjusted to produce the required contrast. Each stored signal corresponds to one of the individual elements in the sensor matrix. The following operations are then performed by software routines.

First the data is transferred to an appropriately sized array in the computer memory, the horizontal and vertical rows of which correspond to those of the sensor elements and of the original picture captured by the camera. Each element in the array is an integer between 0 and 255, representing the amount of light captured by the corresponding sensor element. Summing all the horizontal rows (signals derived from rows of sensor elements parallel to the strip's edges) produces a linear array of summation values in which the values are allocated to positions corresponding to the positions along the perpendicular axis of the CCD array of sensor elements of the rows of elements from which the values were derived. Thus the positions of the summation values in the linear array are directly referable to positions on the perpendicular axis of the sensor element array. Therefore the linear array defines a derived "broad band scan" radiation profile.

An approximate position algorithm recognizes the edges of the strip from that relatively small scale derived radiation profile, and passes the edge positions to a precise position algorithm. Further grey scale sums are calculated again, this time of signals referable to restricted areas closely covering the two edges of the strip 7, to produce futher linear arrays of summation values defining large scale derived radiation profiles relevant to the respective edges of the strip 7. Such a large scale profile is illustrated by FIG. 5. Straight line interpolation between the two plotted points C and D on either side of the mean value (halfway between the values A and B of the dark and bright plateaux respectively) gives the accurate position of the edge with reference to the perpendicular axis of the camera array. From the edge positions the strip width can be calculated with errors much less than the spacing between the original pixels. The actual position of the strip edge from a reference point can also be calculated.

The step of producing a one-dimensional summation values array or derived radiation profile by summation involves an enormous compaction of the video data (from say 256,000 data points, to only 512 data points). This compaction is very time-consuming, and would take about one second using an optimised assembler routine on the preferred vision processing system. If width measurement and edge tracking data are required more frequently, then the data from a previous set of measurements can be used to predict the approximate location of the edges for the next set of measurements. Thus only a small fraction of the initial 256,000 data points then have to be considered, eliminating the need to determine the values of an initial small scale radiation profile.

It is even possible to reduce the number of signals processed to those from only four rows of sensor elements for each edge. Namely, (see FIG. 5), a single row receiving radiation from well away from the edge region to establish a dark reference value A; a complementary row to establish a bright reference value B; and two rows generating signals summing to values C and D, on either side of the mean intensity level, to establish the local radiation profile at the edge itself.

Whether the total number of signals summed is reduced to those from about 8 rows or to some number of rows intermediate 8 and 512, the result is to reduce the number of summing operations that have to be performed, and hence to reduce the time needed for summing. Consequently, the time taken for the edge and width calculations can be reduced to much less than one second. However, if CCIR or RS-170 video formats are used, then a minimum time of 20 ms. (CCIR) or 16.7 ms. (RS-170) (which is the field update period) is needed to obtain a new set of video data.

10. CALIBRATION

Calibration of the apparatus may be achieved with the aid of a special test piece, which is held in the plane of the strip pass line. One possible configuration for the test piece is a sheet marked with alternate light and dark bands. In use, the bands would lie approximately parallel to the strip rolling direction. For preference, the bands should be of the same width, or all the light bands should be one width and all the dark bands another width. The positions of the centres of the dark bands can be measured using the invention by taking the average of the two dark band edge positions. Measurements of this type are immune to flare. The perceived spacings between the centres of the dark bands can be used to generate calibration constants across the field of view of the camera, and hence can be used for absolute calibration of the instrument, and for correction of barrel distortion and other distortion produced by the lens.

11. APPLICATIONS

One application of a width measurement and edge tracking system according to this invention is on a continuous production line where the edges of the strip are being trimmed to reduce the total strip width to a precisely known desired value. If the edges of the strip can be tracked, and if the line has adequate control of strip tracking, then the invention allows the desired width to be produced by trimming only one edge.

In an operation where one or both edges of a strip are being trimmed, the field of view of the system can include the strip before trimming, the slitter, and the strip after trimming. Suitable software can allow the strip width and the edges to be measured simultaneously, by the same camera, frame grabber and data processor, both before and after trimming. Such a modification allows more positive control of the whole operation.

In another application, the widths of the individual slit strips produced by a slitting line can be measured.

A second embodiment of the invention as applied to non-contact extensometry, that is to say the determination of the changes in length and width of a test specimen as testing proceeds, is now described in relation to the testing of a sheet steel specimen, with reference to FIGS. 2, 3, 4 and 5.

In this instance the apparatus of the invention not only indicates the dimensions of the test piece but also transmits that information to a second computer which controls the operation of the testing machine itself.

The apparatus, as seen in FIG. 2, comprises a tensile testing machine 12, comprising a rigid frame 13 supporting a fixed clamp 14 gripping one end of a test piece 15 and a downwardly moveable clamp 16 gripping the opposite end of the test piece. In use the clamp 16 moves to stretch and ultimately snap the test piece 15. The machine 12 is essentially conventional and needs no further description herein. However, in accordance with the invention a CCD camera 17, preferably within a protective housing, is mounted on the frame 13 in a position where it may be focussed on the test piece 15. Also, a contrasting screen 18 may be mounted behind the test piece to enhance the definition of the upright edges of the test piece for the camera and to provide a constant uniform background for the test piece.

The testing machine 12 strains the test piece 15 at a constant rate while recording the load and the apparatus of the invention determines the dimensions of the gauge area of the test piece. Each test normally takes about three minutes, and ideally the load and dimensions are recorded every frame period (40 ms., CCIR). The conventional method of measuring gauge dimensions (the central gauge length and width shown in FIG. 3) involves attaching contact length and width extensometers to the test piece. Unfortunately, the reliable attachment of contact extensometers requires a skilled operator, so, in practice, most tests are performed without the use of extensometers. The movement of the moveable clamp of the testing machine is known, of course, and this movement, coupled with a model of the way in which a typical test piece deforms, can be used to provide a reasonably accurate estimate of the actual gauge length.

However, such routine tests give no information about the change in gauge width. An important parameter of steel, namely, the plastic strain ratio or r-value, can be determined only if both the gauge length and the gauge width are measured. The invention enables these measurements to be readily obtained. Further, the inventive method does not involve a high level of operator skill, and so is suitable for routine testing.

There are three items or regions of interest in a stress-strain curve: yield or proof stress, the region of uniform strain, and the total elongation at fracture. The measurement of proof stress depends upon collecting data points quickly enough to establish the slope of the elastic portion of the curve. At a conventional strain rate, say, about $3.0 \times 10^{-3}$ s$^{-1}$, length measurements should be collected at least every 60 ms. with a reproducability of 0.01%. In the uniform elongation regime, both the length and the width of the central gauge area are required every 1.0 s or so, in order to determine the r-value. Failure of the test piece usually occurs by necking, and the necked region must be included in the gauge length that is used for determining total elongation. Since necking may occur quite near the shoulders of the test piece (FIG. 3), two additional gauge lengths are needed to cover these areas. Total elongation is calculated from the gauge length which has extended most at failure.

Thus the apparatus is preferably able to measure the three gauge lengths and the central gauge width every 40 ms. to an accuracy of 0.01%. Although this requirement is more stringent than the minimum requirement for each of the regions of interest, it has the advantage that just one algorithm is needed to satisfy it, and that modifications to conventional automated tensile testing programs are minimal.

The CCD camera 17 may be the same as that of the first described embodiment, except for appropriate selection of a lens to suit the camera to test piece distance.

Video data from the camera 17 is transmitted to an image processor 19 comprising a frame grabber and data processor as in the first-described embodiment including a real time image digitiser which has four 256 k byte frame stores and produces signals representing 256 grey levels. Processing may be accomplished by two single board computers with 8 MHz 68000 CPUs. Two computers are needed to share the calculations to allow completion within say 20 ms., and handle communication with an automated tensile testing computer 20.

The computer 20 receives the determined length measurements from the vision processor 19 and controls ancillary equipment which prints out or plots them as needed.

It also converts the digital values back to analogue signals for transmission to hardware for the functional control of the testing machine 12.

The geometry of the test piece (FIG. 3) is very simple, with the test piece edges being nearly aligned with the co-ordinates of the sensor array, that is with the pixel axes. The test piece is prepared with accurately spaced transverse inked or other lines 21, the centres of which correspond to the gauge length and the edges of which are those of which the position is determined. The position of each edge of each line 21 is determined and the intermediate position mid-way between them is then calculated as the definitive result. This procedure increases the statistical accuracy of the determination. The test piece may be either light (with a dark background and dark lines) or dark (with a light background and light lines).

An initialisation procedure ensures that the background is uniform, that the image is neither under-exposed nor over-exposed, that there is adequate contrast between the test piece and the background, that the test piece is correctly positioned, and that the spacing of the lines and the width of the test piece are correct. These well defined starting conditions allow the length and width measurement algorithms to be simple and fast.

If the grey scale values of the signals from the sensor elements in each row of the CCD array are summed and the summation values stored as the elements of a one-dimensional array (one value for each horizontal row as in the first embodiment and as indicated by the small scale radiation profile to the right of FIG. 4), then no information is lost about the vertical position of the ink marks in spite of the enormous compaction of the data. A similar statement is valid for summing the vertical rows.

An enlarged radiation profile across an edge of the test piece or an edge of one of the marks thereon plotted from the linear array of the totals of the grey values of the respective rows of CCD elements is essentially the same as the profile illustrated by FIG. 5 in relation to the first described embodiment and the position of the edge may be determined in the same way as before. Indeed the simple two point interpolation is particularly appropriate for non-contact extensometry. Any misalignment between the CCD array co-ordinate axes and the features of the test piece will result in a smearing of the indications of the edges in the summation arrays. Provided the misalignment produces a smearing of only a few pixels, there is no loss of measurement accuracy, but the central section of the radiation profile is fitted best by a straight line. Since this section has a uniform gradient, an edge detection algorithm which searched for a point of maximum gradient would not be as accurate for edge measurement.

As mentioned earlier, causing the system to remember the results of the last set of edge measurements, and assuming that the edges do not move far between measurements, permits even more compaction of the data. FIG. 4 shows by broken lines small regions around the edges of which the positions have to be periodically determined. In the standardised testing situation the initial summation operations may be readily confined to signals from these small areas, and ignoring the rest retains all the useful information while discarding the overwhelming majority of the video data.

As in the first described embodiment even more compaction is possible, as the only grey scale summation points actually needed are a bright reference, a dark reference, and the two points of the radiation profile immediately on either side of the mean.

As mentioned earlier, the rows of sensor elements in the solid state array of a CCD device are separated by dead bands, that is to say bands which are not radiation sensitive. Thus, insofar as described above the invention admits of the possibility of the image of the edge falling directly upon and along a dead band. Should that happen, the signals received from the rows of elements disposed immediately adjacent that dead band are indeterminate to the extent that neither is affected by variations in the position of the image provided it remains wholly within the dead band. This reduces the accuracy of the final determination, although in many applications not to an unacceptable level. In some instances however, where the highest accuracy is desired, the method of the invention may be modified or refined as follows.

The radiation responsive sensor may be de-focussed so as to blur the image falling on the solid state array of elements over about one element spacing.

Alternatively or as well, the alignment of the array may be deliberately set so that the image of the edge may be skewed across from four to ten, preferably say five or six, rows of sensor elements of length of say two hundred elements, and the feature treated as if it were broken up into segments. This may be accomplished by treating the rows of sensor elements substantially parallel to the edge as being correspondingly broken up and producing summation values in respect of each segment. A position indication, that is to say a positional value with respect to the matrix, is then obtained for each segment of the edge by the method of the invention already described and an arithmetical average value of those segment positional values is adopted as the position of the edge itself.

When determining each segment position, interpolation (or extrapolation) is determined with reference to a mean value equal to the mean of the summation values from the bright and dark zones multiplied by the number of sensor elements in the segment and divided by the total number of elements in each row and the average of the segment positions is calculated as a weighted average, with greater weight being given to longer segments, if the segment lengths are not all the same.

For example, if in a particular CCD device each row comprises one hundred and five sensor elements, the segment sums may be calculated for nine segments each ten elements long and a tenth segment fifteen elements long. Segment positional values ($P_1, P_2 \ldots P_{10}$) for corresponding pairs of ten element segments would be determined with reference to a mean value of 10/105 of the full value, and a position for the tenth segment element with reference to a mean value of 15/105 of the full value. The position of the feature edge on the perpendicular axis is then calculated as $(10P_1 + 10P_2 + \ldots + 15P_{10})/105$.

We claim:

1. A method of determining the position of a rectilinear edge between relatively bright and dark zones of a target area, comprising the steps of:
   (a) selecting a video camera of the kind comprising a matrix of individual, radiation-responsive elements disposed in equally spaced apart parallel rows, with the elements of each row equally spaced apart in the direction of the row and transversely aligned with corresponding elements of the other rows, and lens means to project an image of the camera's field of view onto said matrix;
   (b) fixedly positioning the camera relative to said target area to ensure that the camera's field of view includes a substantial length of said edge;
   (c) aligning the camera so that the image of said length of said edge projected onto the matrix extends longitudinally of and lies within a band of the matrix comprising no more than ten neighboring rows of elements;
   (d) summing the signals produced by at least some of the elements of each of a plurality of selected rows of elements, the selected rows being at least those rows on which said image of said length of said edge lies and at least one row on each side thereof, to derive a summation value for each of said selected rows; and
   (e) calculating the position of said image of said length of said edge with respect to the matrix utilizing said summation values and thereby determining the position of said edge with reference to said field of view.

2. A method according to claim 1 wherein said step of calculating the position of said image of said length of said edge is effected by allocating said summation values to positions in a linear array corresponding to the positions in the matrix of the respective rows of elements, determining the mean value of two of said summation values which are, respectively, a high value derived from one of said selected rows of elements at one side of said image of said length of said edge and spaced therefrom and a low value derived from another of said selected rows of elements at the other side of said image of said length of said edge and spaced therefrom, and thereafter determining a position in said linear array corresponding to a value equal to said mean value.

3. A method according to claim 2 wherein said step of determine a position in said linear array corresponding to said mean value is effected by the straight line interpolation of said mean value between the positions in said array of two of said summation values which are the nearest value higher than said mean value and the nearest value lower than said mean value respectively.

4. A method according to claim 2 wherein said step of determining a position in said linear array corresponding to said mean value is effected by determining the position in said array of a value equal to said mean value and lying on the line of best fit with respect to a plurality of said summation values progressively increasing in value above said mean value and a plurality of said summation values progressively decreasing in value below said mean value.

5. A method according to claim 1 further comprising the step of calibrating said linear array by recording a position with respect to said matrix of an image of a said edge of known location with reference to said target area.

6. A method according to claim 2 further comprising the step of storing in a memory a position of said image of said length of said edge with respect to said matrix.

7. A method according to claim 6 further comprising the steps of recalling the stored position from memory and re-determining the position of said image of said length of said edge utilizing summation values derived from selected rows of elements adjacent to the recalled position.

8. A method according to claim 2 wherein the rectilinear edge is an edge of an elongate article moving along a processing line.

9. A method according to claim 8 further comprising the step of controlling the operation of the processing line in response to variations in the determined position of the edge.

10. A method according to any one of claims 1 or 2 wherein the position of a second said edge within the same target area is determined simultaneously.

11. A method according to claim 10 wherein the target area includes a sheet metal tensile test specimen and the respective edges define a gauge length thereof.

12. A method according to any one of claims 1 or 2 wherein the relative brightness and darkness of the zones is with reference to infra-red radiation and the camera's radiation-responsive elements are responsive to that radiation.

13. A method according to any one of claims 1 or 2 further comprising the step of defining said zones on the surface of an article by pre-treating the surface to provide zonal areas having contrasting radiation reflection characteristics.

14. A method according to claim 2 wherein the step of calculating the position of said image of said length of said edge is effected by calculating respective positional values for discrete segments of that image and then calculating the length weighted average of the segment positional values.

15. A method according to claim 1 wherein said image of said length of said edge is skewed across from four to ten rows of said band.

16. A method according to claim 2 wherein the camera is not sharply focused on the target area so that said image of said length of said edge has a blurred width substantially equalling the row spacing of said matrix.

17. Apparatus for determining the position of a rectilinear edge between relatively bright and dark zones comprising:
   a video camera of the kind comprising a matrix of individual radiation-responsive elements disposed in equally spaced parallel rows, with the elements of each row equally spaced apart in the direction of the row and transversely aligned with corresponding elements of the other rows, and lens means to project an image of the camera's field of view onto said matrix;
   camera mounting means for positioning the camera so that a substantial length of the edge is included in the field of view and for aligning the camera so that the image of said length of said edge extends longitudinally of and lies within a band of the matrix comprising no more than ten neighboring rows of elements, a frame grabber for digitizing signals generated by said elements and capturing frames of the digitized signals, and data processing means for processing the captured signals;

wherein said data processing means sums the signals derived from at least some of the elements of each of a plurality of selected rows of elements, the selected rows being at least those rows on which said image of said length of said edge lies and at least one row on each side thereof, allocates the summation values for each of said selected rows of elements to positions in a linear array corresponding to the positions in the matrix of the respective rows of elements, determines the mean value of two of said summation values, being respectively a high value derived from one of said selected rows of elements at one side of said image of said length of said edge and spaced therefrom and a low value derived from another of said selected rows of elements at the other side of said image of said length of said edge and spaced therefrom, and thereafter determines a position in said linear array corresponding to a value equal to said mean value.

* * * * *